United States Patent [19]

Kimura

[11] 4,312,019
[45] Jan. 19, 1982

[54] PHASE CORRECTED VIDEO RECORDING SYSTEM

[75] Inventor: Kenji Kimura, Tachikawa, Japan

[73] Assignee: Olympus Optical Co., Ltd., Tokyo, Japan

[21] Appl. No.: 119,115

[22] Filed: Feb. 6, 1980

[30] Foreign Application Priority Data

Feb. 13, 1979 [JP] Japan .................... 54-15330

[51] Int. Cl.³ ........................................... H04N 5/795
[52] U.S. Cl. ..................................... 360/22; 360/26; 360/27; 360/36
[58] Field of Search ................. 360/22, 23, 27, 28, 360/33, 36, 26, 51; 358/133, 138, 127

[56] References Cited

U.S. PATENT DOCUMENTS 3,412,214 11/1968 Gabor ........................ 360/22
3,975,764 8/1976 Kobayashi et al. ........... 360/23
4,048,658 9/1977 Nakagawa .................. 360/22 X
4,181,822 1/1980 Workman ................... 360/23 X
4,218,713 8/1980 Horak et al. ................ 360/22 X Primary Examiner—Bernard Konick
Assistant Examiner—Donald McElheny, Jr.
Attorney, Agent, or Firm—Toren, McGeady & Stanger

[57] ABSTRACT

A video tape recording apparatus with the use of an Hadamard transformation system is disclosed. The apparatus comprises means for distributing the video signal to a plurality of channels, means for recording and reproducing the distributed video signals by plurality of magnetic heads, means for synchronizing a time-base correction signal for time-base correction with a sampling signal for Hadamard transformation, and means for phase-controlling a sampling signal for Hadamard inverse transformation to the time-base correction signal in phase.

4 Claims, 4 Drawing Figures

PHASE CORRECTED VIDEO RECORDING SYSTEM

BACKGROUND OF THE INVENTION

The present invention relates to a video tape recording apparatus using a Hadamard transformation system for recording and reproducing a video signal.

A recently introduced video tape recording apparatus utilizes a system which distributes a video signal to a plurality of channels and the distributed video signals are recorded and reproduced by a plurality of fixed type magnetic heads. This is the so-called Hadamard transformation system.

In such a video tape recording apparatus, however, input information is converted into a time series signal of n phases for the purpose of obtaining an Hadamard transformation signal, and then, the input signal is sampled.

In case of such recording and reproduction, it is not only necessary to record and reproduce a Hadamard transformation signal but also necessary to record and reproduce a sampling signal with an independent channel or by multiplexing or the like.

In recording and reproducing a sampling signal, however, it is difficult to precisely transmit phase information from the recording system to the reproducing system if FM modulation is used for example, phase distortion of the FM transmission system may undesirably shift the phase of the demodulated sampling signal relative to the Hadamard transformation signal.

Therefore, using a sampling signal having an unstable phase at the time of Hadamard transformation may significantly deteriorate the picture quality.

SUMMARY OF THE INVENTION

It is an object of the present invention to eliminate the above described disadvantages of a conventional video tape recording apparatus.

It is another object of the present invention to provide a video tape recording apparatus for obtaining a good reproduced picture by automatically obtaining a proper sampling signal necessary for Hadamard inverse transformation during reproduction even if phase distortion exists in the transmission path of the recording and reproducing system.

According to the present invention a video tape recording apparatus for recording and reproducing a video signal comprises means for distributing the video signal to a plurality of channels, means for recording and reproducing the distributed video signals with a plurality of magnetic heads, means for synchronizing a time-base correction signal with a Hadamard transformation sampling signal, and means for phase-controlling a Hadamard inverse transformation sampling signal to the phase of the time-base correction signal.

DESCRIPTION OF THE PREFERRED EMBODIMENT

Figure 1:
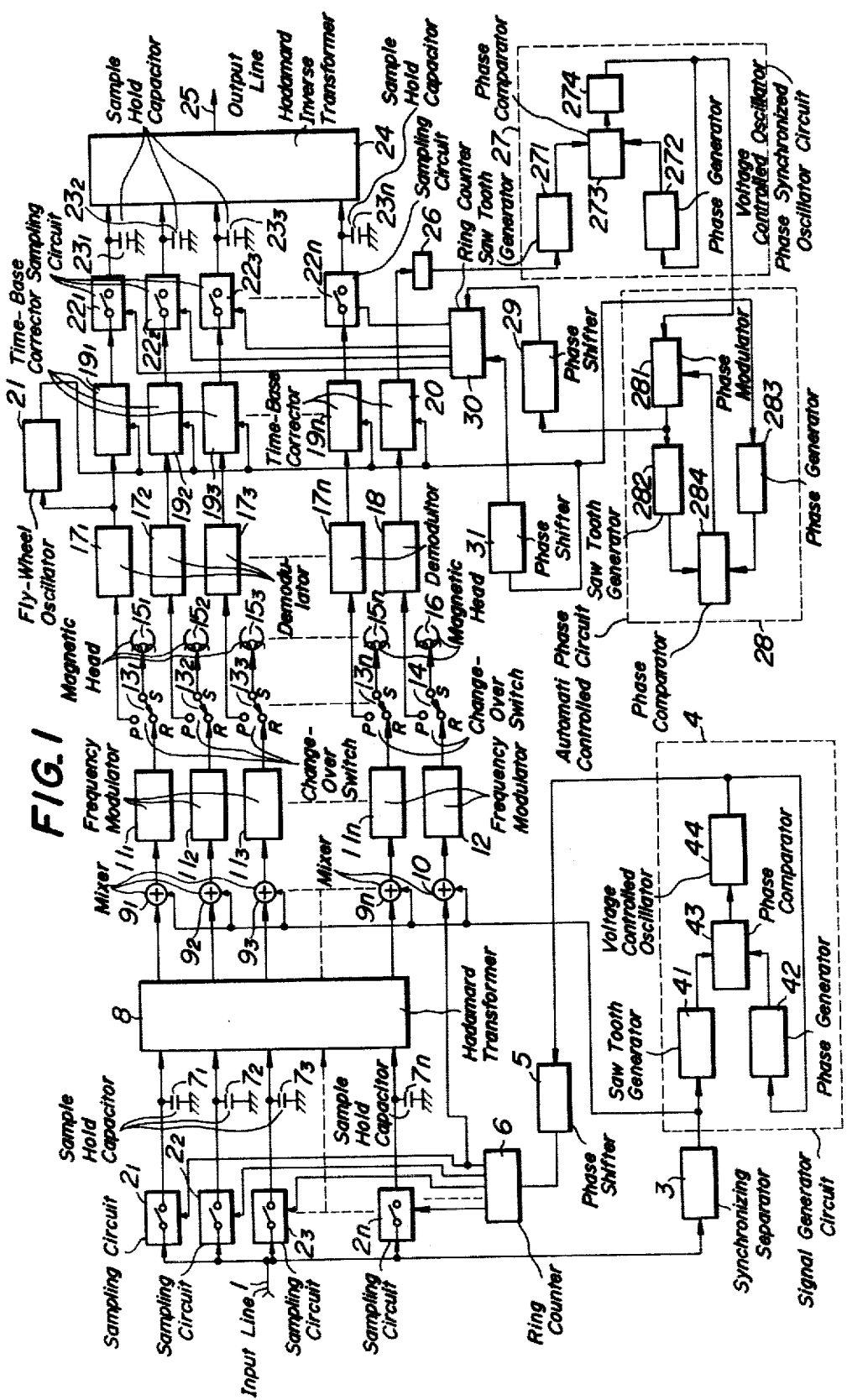
FIG. 1 is a block diagram showing a circuit arrangement of a video tape recording apparatus according to the present invention.

Referring now to the drawing one embodiment of a video tape recording apparatus according to the present invention will be explained.

In FIG. 1, reference numeral 1 carries an input line an input video signal is supplied. This line connected to sampling circuits $2_1$, $2_2-2_n$ of n channels. These sampling circuits $2_1$, $2_2-2_n$ are used for transforming the input video signal into a time series signal.

The input line 1 is also connected to a synchronizing separator 3. The synchronizing separator 3 receives the input video signal a horizontal synchronizing signal separates included therein, and generates it as a time-base correction signal.

The output terminal of the synchronizing separator 3 is connected to a signal generator circuit 4. The signal generator circuit 4 is synchronized with the horizontal synchronizing signal and generates a signal having a frequency which is an integral multiple of the horizontal synchronizing signal. The circuit 4 includes a saw-tooth signal generator 41, a phase comparator 43, a pulse generator 42 and a voltage controlled oscillator 44. An output signal of the saw-tooth signal generator 41 and an output signal of the pulse generator 42 triggered by an output signal of the voltage controlled oscillator 44 are phase-compared by the phase comparator 43 so as to form a negative feedback loop, and the center frequency of the output signal of the voltage controlled oscillator 44 is controlled by a voltage in accordance with a phase difference. In this embodiment, the voltage is about 3.78 MHz which is about 240 times the frequency of the horizontal synchronizing signal.

A phase shifter 5 is connected to the output terminal of the voltage controlled oscillator 44 in the signal generator circuit 4, and also to a ring counter 6. The phase shifter 5 adjusts the phase so as to make the trailing edge of the output signal that determines a sampling phase at the ring counter 6 coincide with a trailing edge of the time-base correction signal. The ring counter 6 also generates a sampling signal of a frequency n for sampling the sampling circuits $2_1$, $2_2-2_n$ in accordance with the output of the voltage controlled oscillator 44.

Each output terminal of the sampling circuits $2_1$, $2_2-2_n$ is connected to sampling hold capacitors $7_1$, $7_2-7_n$ and further connected to an Hadamard transformer 8. This Hadamard transformer 8 includes a resistor matrix and the like for generating Hadamard transformation signals of n channels from the output held in the sampling hold capacitors $7_1$, $7_2-7_n$.

The output terminals of the Hadamard transformer 8 are connected to one input terminal of mixers $9_1$, $9_2-9_n$. The output terminal on any phase (output terminal on the first phase of the sampling circuit $2_1$ in this embodiment) of the ring counter 6 is also connected to one input terminal of a mixer 10. The other input terminals of these mixers $9_1$, $9_2-9_n$ and 10 are connected to the synchronizing separator 3. In this case, the mixers $9_1$, $9_2-9_n$ insert the time-base correction signal of the synchronizing separator 3 into the portion corresponding to the horizontal blanking phase of the video signal of the Hadamard transformation signal of each channel. This serves for absorbing any jitter-drift component contained in the Hadamard transformation signal in each channel during reproduction. The mixer 10 also serves to mix the time-base correction signal in the same manner.

Each output terminal of the mixers $9_1$, $9_2$-$9_n$ and 10 is connected to frequency modulators $11_1$, $11_2$-$11_n$ and 12. These frequency modulators $11_1$, $11_2$-$11_n$ and 12 generate an output of an FM carrier by FM-modulating outputs of the mixers $9_1$, $9_2$-$9_n$ and 10.

The output terminals of these frequency modulators $11_1$, $11_2$-$11_n$ and 12 are connected to recording and reproducing magnetic heads $15_1$, $15_2$-$15_n$ and 16 through recording contacts R-S of switches $13_1$, $13_2$-$13_n$ and 14.

The recording and reproducing magnetic heads $15_1$, $15_2$-$15_n$ and 16 are connected to demodulators $17_1$, $17_2$-$17_n$ and 18 through each reproducing contact P-S of the switches $13_1$, $13_2$-$13_n$ and 14, and each output terminal of these demodulators $17_1$, $17_2$-$17_n$ and 18 is connected to time-base correctors $19_1$, $19_2$-$19_n$ and 20, respectively. The time-base correctors $19_1$, $19_2$-$19_n$ serve to absorb a jitter-drift component contained in the reproduced Hadamard transformation signal. A time-base corrector 20 serves also to absorb and remove the jitter-drift component contained in the output reproduced by the magnetic head 16 in the same manner. In this case, the time-base correctors $19_1$, $19_2$-$19_n$ and 20 are connected to receive the output of a flywheel oscillator 21 as a reference signal. The flywheel oscillator 21 is connected to the output terminal of the demodulator $17_1$ so as to generate a reference phase signal of the reproduced video signal in which the jitter-drift component is absorbed and removed from the time-base correction signal synchronized with the sampling signal for Hadamard transformation. The sampling signal during Hadamard transformation is synchronized with the time-base correction signal because the output of the phase shifter 5 that determines the sampling phase of the ring counter 6 is synchronized with the time-base correction signal by phase-adjustment.

The output terminals of the time-base correctors $19_1$, $19_2$-$19_n$ are connected to sampling circuits $22_1$, $22_2$-$22_n$. These sampling circuits $22_1$, $22_2$-$22_n$ successively generate the outputs of each time-base corrector $19_1$, $19_2$-$19_n$ in accordance with the sampling signal.

The output terminals of the sampling circuits $22_1$, $22_2$-$22_n$ are connected to sample hold capacitors $23_1$, $23_2$-$23_n$, respectively and further connected to an Hadamard inverse transformer 24.

The inverse transformer 24 is composed of a resistor matrix and the like to reproduce the original video signal from the output held in the sample hold capacitors $23_1$, $23_2$-$23_n$ and supply it to an output line 25.

The output terminal of the time-base correcter 20 is connected to bandpass filter 26. The filter 26 removes the time-base correction signal mixed by the mixer 10 and passes a sampling signal only.

The output terminal of the filter 26 is connected to a phase synchronized oscillator circuit 27. The phase synchronized oscillator circuit 27 serves to reproduce a sampling signal having the same frequency as that of the ring counter 6. The circuit 27 is composed of a saw-tooth signal generator 271, a phase comparator 272, a pulse generator 273 and a voltage controlled oscillator 274. These to form a negative feedback loop by comparing an output of the saw-tooth signal generator 271 triggered by the output of the filter 26 with an output of the pulse generator 273 triggered by the output of the voltage controlled oscillator 274. They control the center frequency of the output signal of the voltage controlled oscillator 243 with the voltage determined by the phase difference.

The frequency of the output signal of the voltage controlled oscillator 274 is made equal to that of the ring counter 6 by multiplying by n since the frequency of the input signal supplied through the filter 26 is a frequency corresponding to one phase of the ring counter 6, i.e., 1/n of the frequency n of the ring counter 6.

The output terminal of the voltage controlled oscillator circuit 274 in the phase synchronized oscillator circuit 27 is connected to an APC (automatic phase control) circuit 28. This APC circuit 28 serves to remove phase distortion in the transmission path of the recording and reproducing system, and includes a phase modulator 281, a saw-tooth signal generator 282, a pulse generator 283 and a phase comparator 284. The latter compare an output of the pulse generator 283 triggered by the output of the flywheel oscillator 31 with an output of the saw-tooth signal generator 282 connected to the phase modulator 281 in the phase comparator 284. They control the delay in the phase difference of the phase modulator 281 with the voltage on the basis of the phase difference. Such a control system constitutes a negative feedback loop, and its gain is largely set so as precisely to cause coincidence of the output of the phase modulater 281 with the output of the flywheel oscillator 21, i.e., a reference phase signal of the reproduced video signal.

The output terminal of the phase modulator 281 in the APC circuit 28 is connected to the ring counter 30 through the phase shifter 29. The ring counter 30 determines a sampling phase in accordance with the output having a phase corrected by the phase modulator 281 and generates a sampling signal for sampling the sampling circuits $22_1$, $22_2$-$22_n$. The ring counter 30 is further connected to the flywheel oscillator 21 through the phase shifter 31 to receive a reset pulse for determining a sart phase of the ring counter 30 from the phase shifter 31.

In operation the switches $13_1$, $13_2$-$13_n$ and 14 are first considered as set in the recording position with the recording contacts R-S connected.

Figure 2:
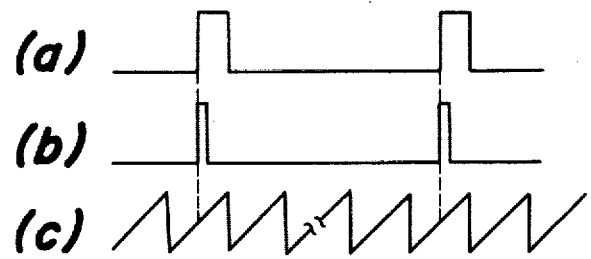
FIG. 2 is a waveform diagram showing signals generated in a signal generator circuit shown in FIG. 1.

In this condition, if an input video signal is supplied to the input line 1, the synchronizing separator 3 separates the horizontal synchronizing signal contained in the input video signal and generates it as a time-base correction signal. This signal operates the signal generator circuit 4 to generate an output at the saw-tooth generator 41. The phase comparator 43 compares this output with an output of the pulse generator 42 triggered by the output signal of the voltage controlled oscillator 44, and the voltage controlled oscillator 44 is controlled by a voltage in accordance with the phase difference in this case. This generates a signal having a frequency synchronized with the above horizontal synchronizing signal and of an integral multiple of the horizontal synchronizing signal. This condition is shown in FIG. 2 in which waveform b is an output of the pulse generator 42 waveform c is an output of the saw-tooth signal generator 41 and waveform a is an output of the voltage controlled oscillator 44.

Figure 3:
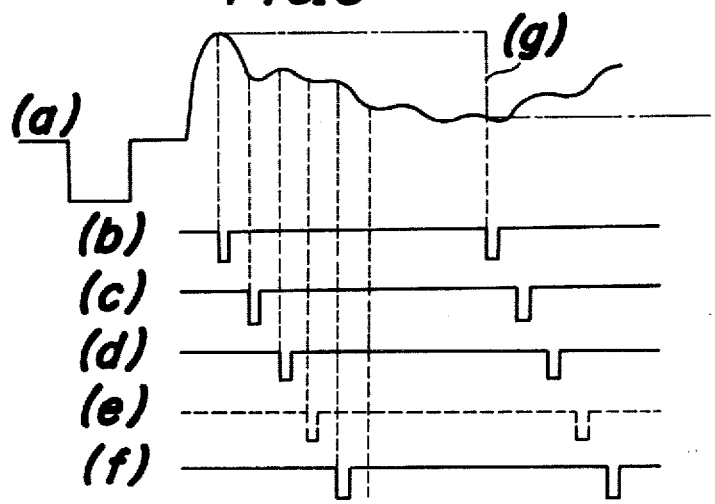
FIG. 3 is a waveform diagram showing signals generated in a ring counter shown in FIG. 1.
Figure 4:
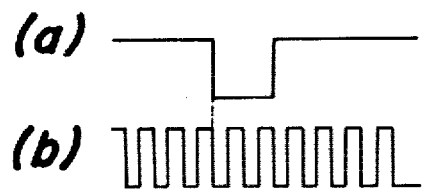
FIG. 4 is a waveform diagram showing signals generated in a phase shifter shown in FIG. 1.

The output of the voltage controlled oscillator 44 is phase-adjusted by the phase shifter 5 and supplied to the ring counter 6. In this case, the output signal of the phase shifter 5 coincides with the trailing edge of the time-base correction signal. This is shown in FIG. 4, in which waveform a is a time-base correction signal and waveform b is an output signal of the phase shifter 5. Thereafter, a sampling signal is generated from the ring counter 6 and each sampling circuit $2_1$, $2_2$-$2_n$ is successively sampled. Accordingly, the input video signal is transformed into a time-series signal and sampling-held by each sampling capacitor $7_1$, $7_2$-$7_n$. This state is shown in FIG. 3, in which waveform a is an input video signal, waveforms b to f sampling signal in each phase of the ring counter 6, and waveform g is an example of the sample hold voltage simple-held by the capacitor $7_1$.

Thereafter, each sample hold output of the sample hold capacitors $7_1$, $7_2$-$7_n$ is supplied to the Hadamard transformer 8, transformed into an Hadamard transformation signal of n channels therein and supplied to one input terminal of the mixers $9_1$, $9_2$-$9_n$. Then, these mixers $9_1$, $9_2$-$9_n$ mix the time-base correction signal supplied from the synchronizing separator 3 into the Hadamard transformation signal and supply the mixed signal to the frequency modulators $11_1$, $11_2$-$11_n$. Accordingly, the frequency modulators $11_1$, $11_2$-$11_n$ FM-modulate the outputs supplied from the mixers $9_1$, $9_2$-$9_n$ and generate the output of an FM carrier. Then, this output is supplied to the magnetic heads $15_1$, $15_2$-$15_n$ through the recording contacts R-S of the switches $13_1$, $13_2$-$13_n$ to record it into a magnetic tape (not shown) or the like.

The sampling signal in one phase of the ring counter 6 is also supplied to the mixer 10, mixed with the time-base correction signal therein, FM-demodulated by the frequency demodulator 12, thereafter supplied to the magnetic head 16 through the switch 14 and recorded into the magnetic tape (not shown).

From this state, the reproducing contacts P-S of the switches $13_1$, $13_2$-$13_n$ and 14 are closed to set the reproduction mode. Then, the output of the magnetic heads $15_1$, $15_2$-$15_n$ are supplied to the demodulators $17_1$, $17_2$-$17_n$ through the reproducing contacts P-S of the switches $13_1$, $13_2$-$13_n$ and demodulated. The outputs of these demodulators $17_1$, $17_2$-$17_n$ are supplied to the time-base correctors $19_1$, $19_2$-$19_n$, where the output of the flywheel oscillator 21 is made a reference signal so that the jitter-drift component contained in the reproduced Hadamard transformation signal is absorbed, and thereafter supply it to the sampling circuits $22_1$, $22_2$-$22_n$, respectively.

The output of the magnetic head 16 is also supplied to the demodulator 18 through the reproducing contacts P-S of the switch 14, and supplied to the time-base corrector 20 so that the jitter-drift component is removed in the same manner. The output of the time-base corrector 20 is supplied to the bandpass filter 26 so as to remove the time-base correction signal so that the sampling signal is only taken out.

This signal is supplied to the phase synchronizing oscillator circuit 27. In this oscillator circuit 27, the phase comparator 272 compares the output of the saw-tooth generator 271 generated by the sampling signal with the output of the pulse generator 273 triggered by the output signal of the voltage controlled oscillator 274. The latter is controlled by the voltage in accordance with the phase difference. Then, the output of the voltage controlled oscillator 274 is controlled to multiply the sampling signal obtained from the filter 26 by n, and then, the sampling signal having the same frequency as that of the aforementioned ring counter 6 is reproduced. Further, the output of the voltage controlled oscillator circuit 274 is supplied to the APC circuit 28. In the APC circuit 28, the phase comparator 284 compares the output of the pulse generator 283 triggered by the output of the flywheel oscillator 21 with the output of the saw-tooth generator 282, to which the output of the voltage controlled oscillator 274 is supplied through the phase demodulator 281, so that the phase delay of the phase demodulator 281 is controlled by the voltage in accordance with the phase difference. The output of the phase demodulator 281 is controlled so as to coincide with the phase of the output of the flywheel oscillator 21. In this case, the flywheel oscillator 21 generates a reference phase signal of the reproduced video signal from the time-base correction signal (as apparent from the explanation of FIG. 4) synchronized with the sampling signal for the Hadamard transformation, so that the output of the phase demodulator 281 for determining the sampling phase of the ring counter 30 coincides with the sampling signal for the Hadamard transformation.

When the output of such phase demodulator 281 is supplied to the ring counter 30 through the shifter 29, the ring counter 30 determines the start phase by a reset pulse supplied by the phase shifter 31, generates a sampling signal and samples the sampling circuits $22_1$, $22_2$-$22_n$.

Then, the outputs of these sampling circuits $22_1$, $22_2$-$22_n$ are held in the sample hold capacitors $23_1$, $23_2$-$23_n$, and thereafter supplied to the Hadamard inverse transformer 24, where the original video signal is reproduced and generate to the output line 25 as a reproduced video signal.

According to the above, the signal for the Hadamard inverse transformation can be controlled to the same phase as that of the time-base correction signal synchronized with the sampling signal for the Hadamard transformation. Hence, even if phase distortion exists in the transmission path of the recording and reproduction system for example, a proper sampling signal necessary for Hadamard inverse transformation is automatically obtained during reproduction. This results in a very good reproduced picture image.

In addition, the present invention is not limited to the above embodiment but can be modified without departing from the scope of the invention.

As described above, according to the invention, even if the phase distorsion exists in the transmission path of the recording and reproducing system, a proper sampling signal necessary for Hadamard inverse transformation is automatically obtained during reproduction, to permit a very good reproduced picture image.

What is claimed is:

1. A video tape recording apparatus for recording and reproducing a video signal comprising: a plurality of channels, means for distributing the video signal to a plurality of channels, a plurality of magnetic heads, means for recording and reproducing the distributed video signals in the channels with the plurality of magnetic heads, means for forming a time-base correction signal synchronous with a sampling signal for Hadamard transformation, and means for detecting and phase-controlling a sampling signal for Hadamard inverse transformation to the phase of the time-base correction signal.

2. A video tape recording apparatus, comprising:
   distributing means for distributing a video signal to a plurality of channels,
   sampling means for sampling signals in each of the channels, transforming means for subjecting the sampled signals in each of the channels to a Hadamard transformation, head means for recording each of the channels and picking up the recorded signals in each channel, inverse transforming means for inverse-transforming the resampled signals, correction means for forming a time-base correction signal from a sampled signal and transmitting the corrected signal to the head means, and phase controlling means responsive to the recorded correction signal for phase controlling the resampled correction signal and applying the phase controlled correction signal to the inverse transforming means.

3. A device as in claim 2, wherein said correction means includes a phase shifter and a phase correction loop.

4. A device as in claim 2, where said phase controlling means includes a phase shifter and a phase correction loop.

* * * * *